US010655352B2

(12) United States Patent
Doraci

(10) Patent No.: US 10,655,352 B2
(45) Date of Patent: May 19, 2020

(54) BALANCE AND LIFT PARKING APPARATUS

(71) Applicant: Alfred Doraci, Bloomington, IN (US)

(72) Inventor: Alfred Doraci, Bloomington, IN (US)

( * ) Notice: Subject to any disclaimer, the term of this patent is extended or adjusted under 35 U.S.C. 154(b) by 0 days.

(21) Appl. No.: 16/514,952

(22) Filed: Jul. 17, 2019

(65) Prior Publication Data

US 2020/0024861 A1 Jan. 23, 2020

Related U.S. Application Data

(60) Provisional application No. 62/699,548, filed on Jul. 17, 2018.

(51) Int. Cl.
*B60P 3/08* (2006.01)
*E04H 6/06* (2006.01)
*B66F 7/24* (2006.01)

(52) U.S. Cl.
CPC .............. *E04H 6/065* (2013.01); *B66F 7/243* (2013.01)

(58) Field of Classification Search
CPC ........................................................ B60P 3/08
USPC .................................................. 414/229, 256
See application file for complete search history.

(56) References Cited

U.S. PATENT DOCUMENTS 5,511,924 A * 4/1996 Liang ...................... E04H 6/065 414/229
2008/0014068 A1 * 1/2008 Smith ....................... B60P 3/06 414/545

* cited by examiner

*Primary Examiner* — Saul Rodriguez
*Assistant Examiner* — Willie Berry, Jr.

(57) ABSTRACT

A balance and lift parking apparatus increases parking space availability and therefore allows users to park more than one automobile vertically. The balance and lift parking apparatus includes a support structure, a parking platform, a first wheel track, and a second wheel track. The support structure is the structural base of the balance and lift parking apparatus. Further, the support structure allows the balance and lift parking apparatus to support the weight of automobiles. Moreover, the support structure provides a clearance area from the ground surface which allows at least one automobile to be parked. The parking platform provides a surface on which at least one automobile may traverse onto. The first wheel track and the second wheel track are used to guide at least one automobile onto and along the parking platform.

11 Claims, 7 Drawing Sheets

BALANCE AND LIFT PARKING APPARATUS

The current application claims a priority to the U.S. Provisional Patent application Ser. No. 62/699,548 filed on Jul. 17, 2018.

FIELD OF THE INVENTION

The present invention generally relates to automobiles and automobile parking structures. More specifically, the present invention relates to parking structures which allows vertical parking of automobiles over other automobiles.

BACKGROUND OF THE INVENTION

Nowadays, automobiles are essential part of millions of people's lives. More and more people now own an automobile, with families even owning multiple vehicles. Unfortunately, with the growing number of vehicles available on the roads today, the limited parking space available is a growing problem in many places. For example, many major cities have a large parking problem as more and more people drive to the city for various reasons such as for work, leisure, etc. Public transportation and ride-sharing have been promoted as possible solutions to the scarcity of parking space, but cities still face a major problem, especially during major events, holidays, etc. Even non-major cities face parking problems. Many residential cities and towns face a parking problem as oftentimes individuals and families own multiple automobiles. It's common for families to have multiple automobiles for the various family members. Likewise, many individuals sometimes possess more than one automobile if one the automobiles is only used for work or other special reasons. While many residential places provide parking space for one or two automobiles, not all places offer enough parking spaces and if the residents own more than two automobiles, then the options available to the residents can be scarce. A common option for people with lack of parking space has to park the automobile on the street. However, many cities have strict parking laws which limit options like parking on the street. Some solutions have been provided to address the parking problem such as providing a garage plus a parking driveway, so more automobiles can be parked on a property. Unfortunately, not all residences offer this option. Thus, a better parking option to increase the available parking spaces in areas where parking is limited is necessary.

An objective of the present invention is to provide balance and lift parking apparatus. The balance and lift parking apparatus addresses the limited parking spaces available to users. The balance and lift parking apparatus utilizes a mechanism based on the weight balance of an automobile. The balance and lift parking apparatus comprises a light, mobile structure which can be transported to the desired location. By providing a structure which enables vertical parking instead of horizontal parking, the balance and lift parking apparatus will provide more space on the ground and therefore more parking opportunities and less problems in the future.

SUMMARY OF THE INVENTION

The present invention provides a balance and lift parking apparatus, preferably known as LIPALDO. The balance and lift parking apparatus provides a light, mobile structure which can be folded/unfolded. When unfolded, the balance and lift parking apparatus allows a first automobile to drive up the ramp onto the top portion of the balance and lift parking apparatus. The automobile can be driven slowly up the ramp until the weight of the automobile rotates the ramp to a horizontal position parallel to the ground. The rotation of the top ramp is achieved as a result of the connection between the support structure and the top ramp in a balance scale-like fashion. The weight of the first automobile parked on the top ramp holds the ramp in position, preventing the ramp from moving or blocking the way of a second automobile parked under the support structure. The support structure of the balance and lift parking apparatus provides a parking space underneath, allowing two automobiles to be parked vertically, one on top of the other. The balance and lift parking apparatus when unused allows the top ramp to be folded so the balance and lift parking apparatus does not obstruct or take the limited spaces where the balance and lift parking apparatus is located. The balance and lift parking apparatus addresses the public need for parking space in a simple, practical, and effective way.

BRIEF DESCRIPTION OF THE DRAWINGS

FIG. 1 is a front-top perspective view of the present invention in the.

DETAIL DESCRIPTIONS OF THE INVENTION

Figure 1:
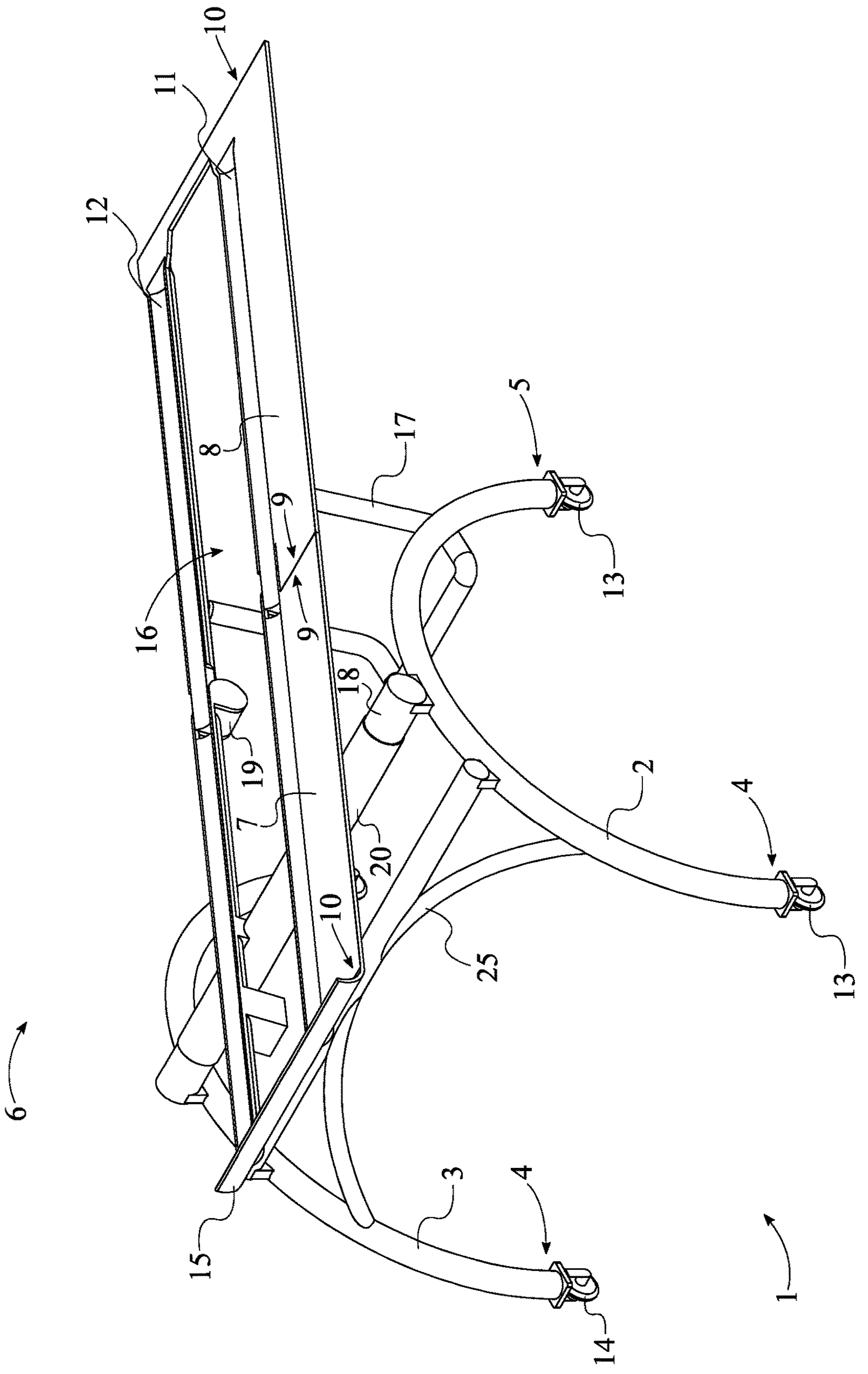

All illustrations of the drawings are for the purpose of describing selected versions of the present invention and are not intended to limit the scope of the present invention.

In reference to FIGS. 1 through 7, the present invention is a balance and lift apparatus that increases parking space availability and therefore allows users to park more than one automobile vertically. The present invention comprises a support structure 1, a parking platform 6, a first wheel track 11, and a second wheel track 12. The support structure 1 is the structural base of the present invention. Further, the support structure 1 allows the present invention to support the weight of automobiles. Moreover, the support structure 1 provides a clearance area from the ground surface which allows at least one automobile to be parked. The parking platform 6 provides a surface on which at least one automobile may traverse onto. The first wheel track 11 and the second wheel track 12 are used to guide at least one automobile onto and along the parking platform 6.

Figure 2:
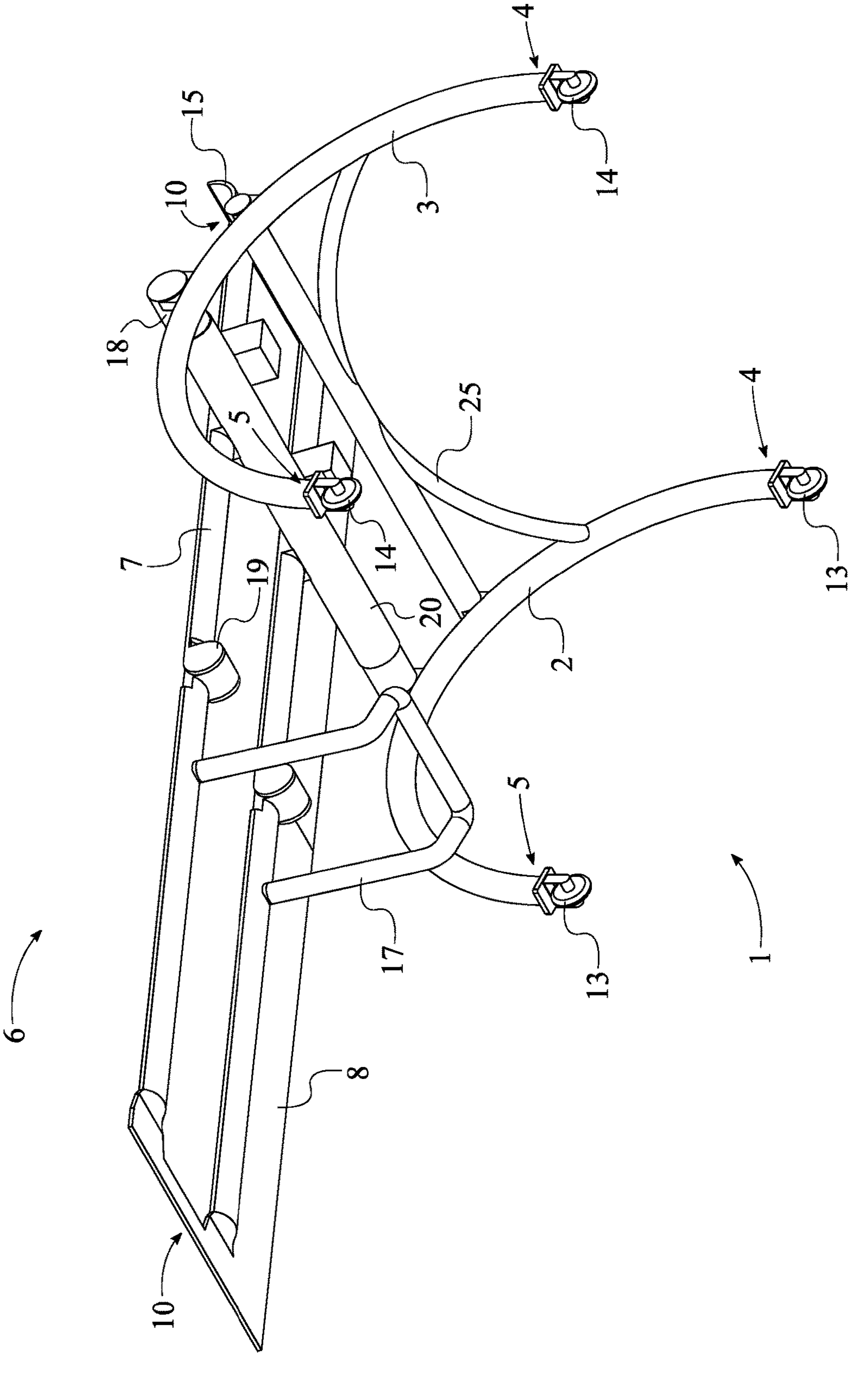
FIG. 2 is a rear-bottom perspective view of the present invention.

The general configuration of the aforementioned components allows the present invention to increase parking space availability and therefore allow users to park more than one automobile vertically. With reference to FIGS. 1 and 2, the parking platform 6 comprises a first section 7 and a second section 8. The first section 7 is hingedly and terminally connected to the second section 8. This arrangement allows the second section 8 to rotate about the first section 7. In further detail, the second section 8 can be rotated towards the first section 7 in order to allow another automobile to park in the clearance area beneath the support structure 1 after the first automobile is parked on the parking platform 6. Further, the first section 7 is hingedly and laterally connected to the support structure 1. This arrangement allows the first section 7 to be tilted about the support structure 1. In further detail, the first section 7 can be tilted with the second section 8 in order for the parking platform 6 to be oriented towards the ground surface. Thus, at least one automobile is able to traverse along the parking platform 6. The first wheel track 11 and the second wheel track 12 are integrated into the parking platform 6. Further, the first wheel track 11 and the second wheel track 12 are positioned parallel and opposite to each other across the parking platform 6. This arrangement structurally forms guides in order for the parking platform 6 to receive and guide each wheel of at least one automobile.

In the preferred embodiment of the present invention and with reference to FIGS. 1 and 2, the support structure 1 comprises a first support arch 2, a second support arch 3, and a third support arch 25. The first support arch 2 and the second support arch 3 are arch-shaped structures which allow the support structure 1 to support the weight of the parking platform 6 and at least one automobile. The third support arch 25 further reinforces the support structure 1. The first support arch 2 and the second support arch 3 are positioned offset from each other. This arrangement evenly distributes the weight of the parking platform 6 and at least one automobile onto the support structure 1. Further, the third support arch 25 is positioned between the first support arch 2 and the second support arch 3 in order to reinforce each the first support arch 2 and the second support arch 3. In other embodiments of the present invention, the support structure 1 may comprise a variety of supports in a variety of arrangements in order to support the weight of the parking platform 6 and at least one automobile.

In order to easily transport or move the present invention and with reference to FIGS. 1 and 2, the present invention may further comprise a first pair of wheels 13 and a second pair of wheels 14. The first pair of wheels 13 and the second pair of wheels 14 may be any type of wheel and of any composition which allows the present invention to be moved across a surface. The first support arch 2 and the second support arch 3 each comprise a first arch end 4 and a second arch end 5. The first pair of wheels 13 are mounted to the first arch end 4 of the first support arch 2 and the second arch end 5 of the first support arch 2. This arrangement allows the first support arch 2 to be moved across a surface. Similarly, the second pair of wheels 14 are mounted to the first arch end 4 of the second support arch 3 and the second arch end 5 of the second support arch 3. This arrangement allows the second support arch 3 to be moved across a surface. Thus, the first pair of wheels 13 and the second pair of wheels 14 allow the support structure 1 to be moved across a surface, and thus allows the present invention to be transported. Moreover, the third support arch 25 is positioned offset from the first arch end 4 of the first support arch 2 and the first arch end 4 of the second support arch 3. This arrangement provides enough clearance area for at least one automobile to be parked beneath the support structure 1.

Figure 5:
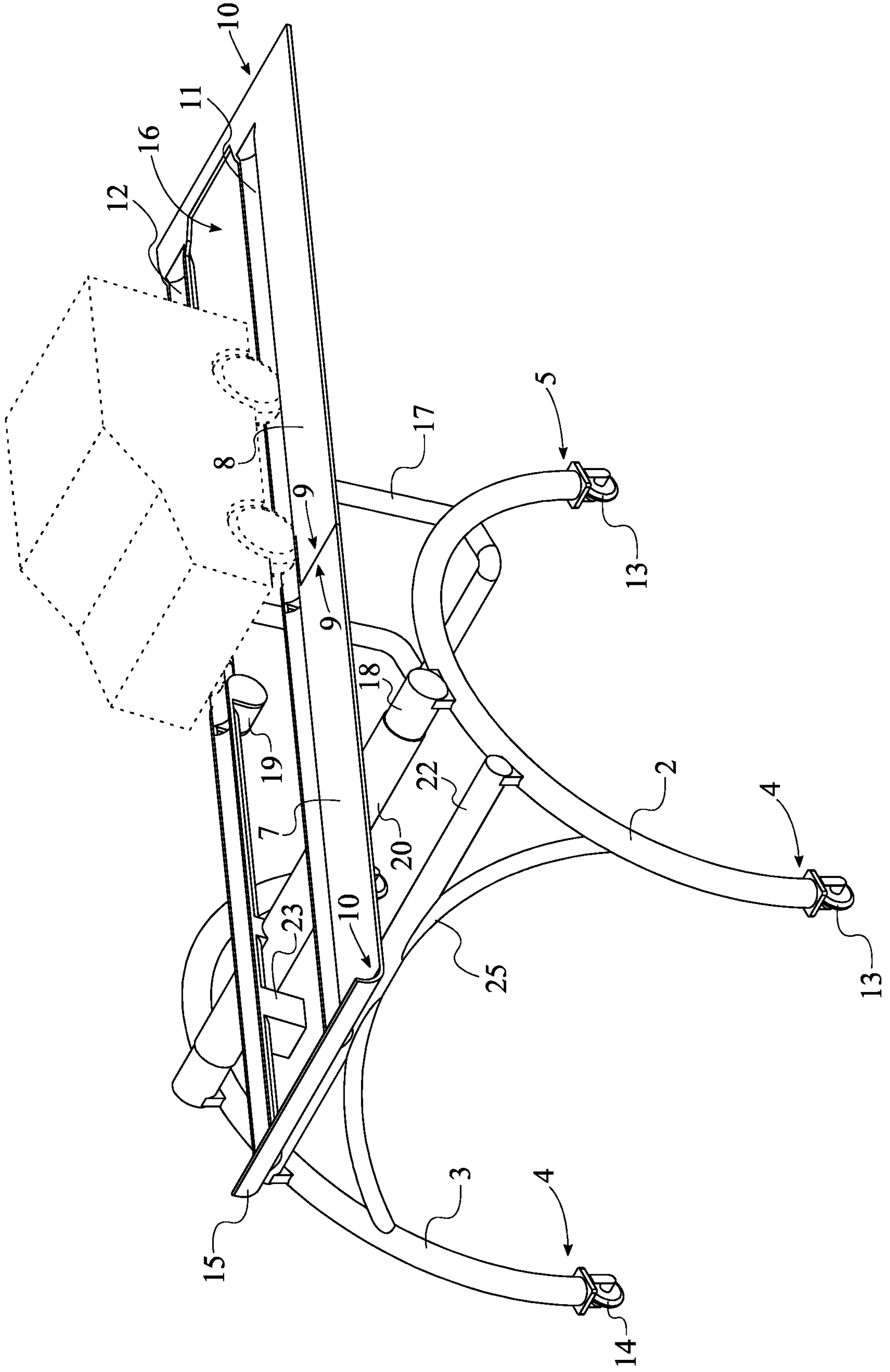
FIG. 5 is a front-top perspective view of the present invention with the parking platform in the loading configuration and an automobile traversing onto the parking platform.

In order to prevent at least one automobile from accidentally rolling off the parking platform 6 and with reference to FIG. 5, the present invention may further comprise an elongated wheel chock 15. The elongated wheel is a sturdy structure which is designed to prevent accidental movement of wheels of an automobile. The first section 7 and the second section 8 each comprise a proximal end 9 and a distal end 10. Further detailing the arrangement between the first section 7 and the second section 8, the proximal end 9 of the first section 7 is hingedly connected to the proximal end 9 of the second section 8. Moreover, the elongated wheel chock 15 is integrated into the distal end 10 of the first section 7. This arrangement allows the elongated wheel chock 15 to prevent accidental movement of the wheels of an automobile parked on the first section 7.

In order for the present invention to be easier to transport and with reference to FIG. 1, the present invention may further comprise a weight-reducing cutout 16. The weight-reducing cutout 16 is an open slot used to reduce the weight of the parking platform 6. The weight-reducing cutout 16 traverses through the parking platform 6 and is positioned between the first wheel track 11 and the second wheel track 12. This arrangement effectively reduces the weight of the parking platform 6 while still allowing the parking platform 6 to receive at least one automobile through the first wheel track 11 and the second wheel track 12.

Figure 3:
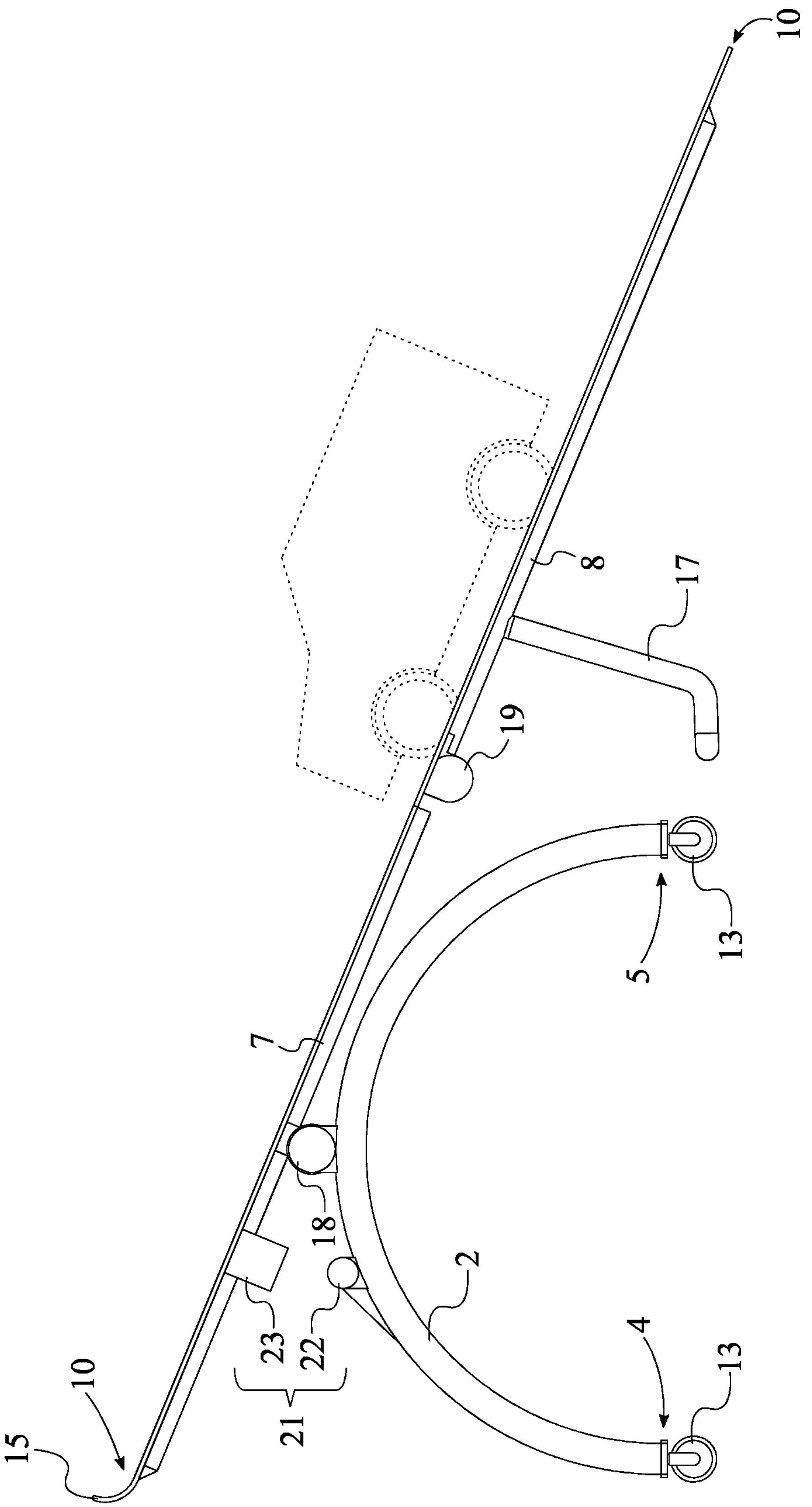
FIG. 3 is a side view of the present invention with the parking platform in the loading configuration.
Figure 4:
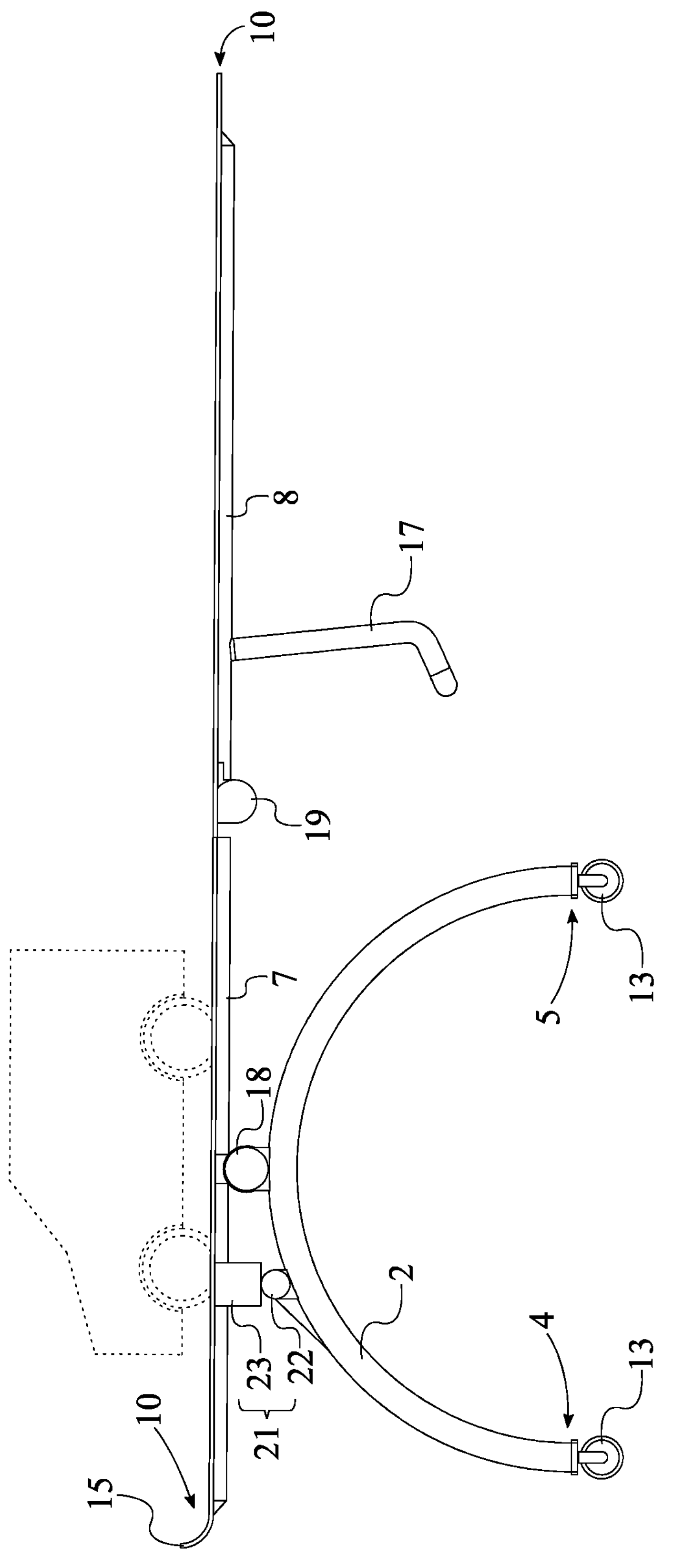
FIG. 4 is a side view of the present invention in an intermediate step between the loading configuration and the parking configuration.

In order for the second section 8 to support the weight of at least one automobile and with reference to FIGS. 3 and 4, the present invention may further comprise a platform stand 17. The platform stand 17 is an angle structure used to support the second section 8 when the parking platform 6 is oriented towards the ground surface. The platform stand 17 is mounted to the second section 8, opposite the first wheel track 11 and the second wheel track 12. This arrangement positions the platform stand 17 in order to aid the second section 8 in supporting the weight of at least one automobile.

With reference to FIG. 1, the present invention may further comprise a fulcrum 18. The fulcrum 18 is a structure where the first section 7 can tilt. Further detailing the hinged connection between the first section 7 and the support structure 1, the first section 7 is hingedly connected to the support structure 1 by the fulcrum 18. This arrangement allows the first section 7 to tilt about the fulcrum 18 in order for the parking platform 6 to have enough structural integrity to receive at least one automobile.

Figure 6:
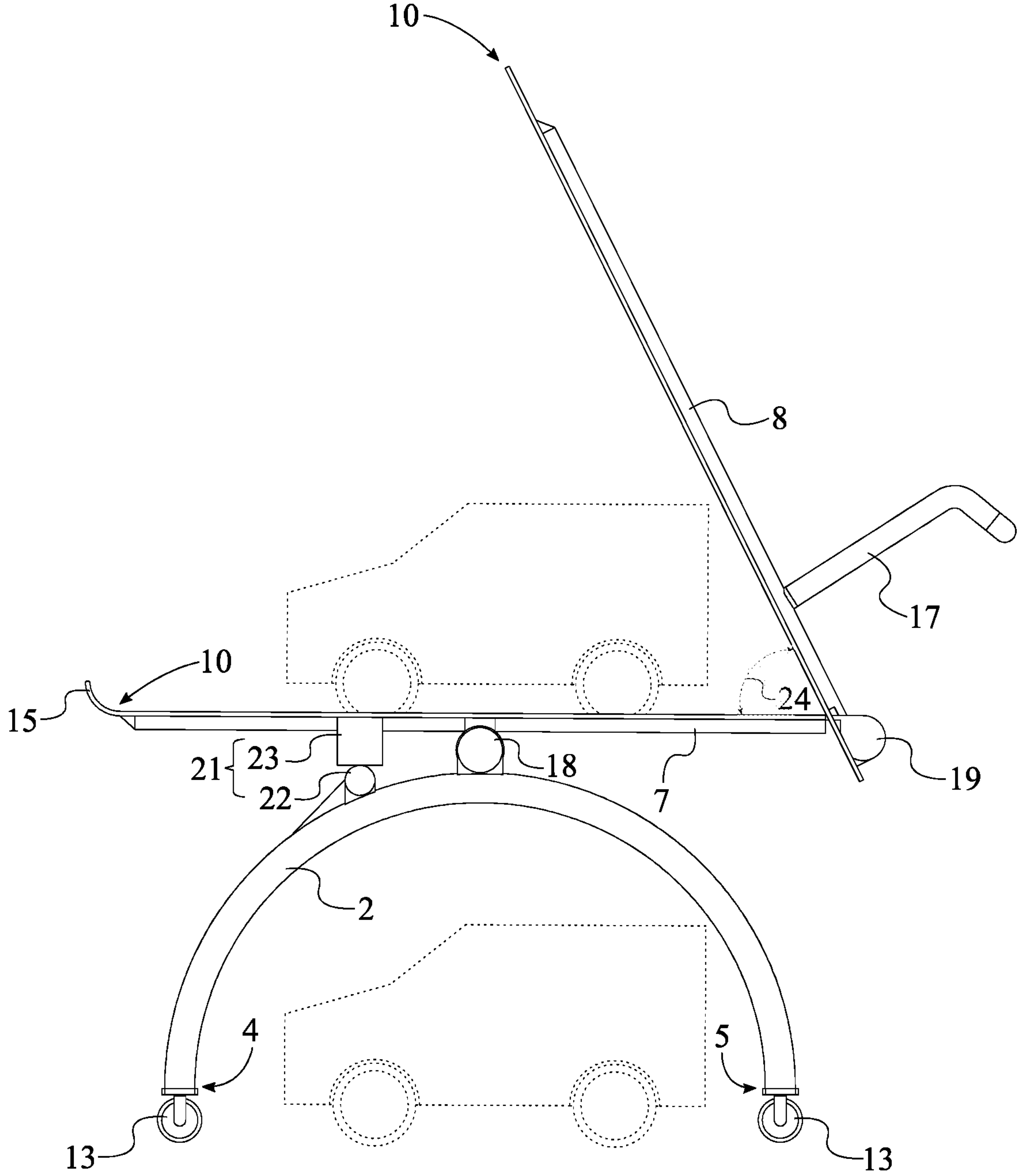
FIG. 6 is a side view of the present invention with the parking platform in the parking configuration, an automobile parked on the parking platform, and another automobile parked beneath the support structure.

With reference to FIGS. 3 and 6, the present invention may further comprise a first rotation mechanism 19. In the preferred embodiment of the present invention, the first rotation mechanism 19 is spring recoil mechanism. The first rotation mechanism 19 is operatively coupled to the hinged connection between the first section 7 and the second section 8. The first rotation mechanism 19 is used to fold in or unfold out the second section 8. In further detail, the first rotation mechanism 19 controls the hinged connection between the first section 7 and the second section 8 thus allowing a user to fold in or unfold out the second section 8 when desired. The second section 8 can be folded towards the first section 7 in order to allow an automobile to park beneath the support structure 1. The second section 8 can be folded coplanar to the first section 7 in order to allow an automobile traverse onto the parking platform 6.

With refence to FIGS. 1 and 2, the present invention may further comprise a second rotation mechanism 20. The second rotation mechanism 20 is preferably a spring recoil mechanism. The second rotation mechanism 20 is operatively coupled to the hinged connection between the first section 7 and the support structure 1. The second rotation mechanism 20 is used to tilt the first section 7 about the support structure 1. Thus, the parking platform 6 can be oriented towards the ground surface by tilting the first section 7 through the second rotation mechanism 20. Further, this allows the parking platform 6 to receive at least one automobile by acting as a ramp.

With reference to FIGS. 3 and 6, the present invention may further comprise a rotation stopping device 21. The rotation stopping device 21 is used to prevent the first section 7 from being over-tilted where the automobile may roll off the first section 7 after being parked on the first section 7. The rotation stopping device 21 comprises a first brace 22 and a second brace 23. The first brace 22 is connected across the support structure 1 and positioned offset from the parking platform 6. This arrangement positions the first brace 22 in order to contact the second brace 23 when the parking platform 6 is at parallel to the ground surface. Further, the second brace 23 is laterally connected to the first section 7 and is positioned opposite to the first wheel track 11 and the second wheel track 12. This arrangement positions the second brace 23 to contact the first brace 22 when the parking platform 6 is tilted to be parallel to the ground surface.

With reference to FIGS. 3 and 5, the parking platform 6 and the rotation stopping device 21 can be arranged into a loading configuration. The loading configuration allows the parking platform 6 to receive at least one automobile. In the loading configuration, the first section 7 and the second section 8 are positioned coplanar to each other. This arrangement provides a surface on which at least one automobile may traverse onto for parking purposes. Further, the first brace 22 and the second brace 23 are positioned offset from each other. In further detail, the first section 7 is tilted towards the ground surface in order for the parking platform 6 to receive at least one automobile. Further, the loading configuration may also be used as a departing configuration which allows at least one automobile to drive down and off the parking platform 6.

Figure 7:
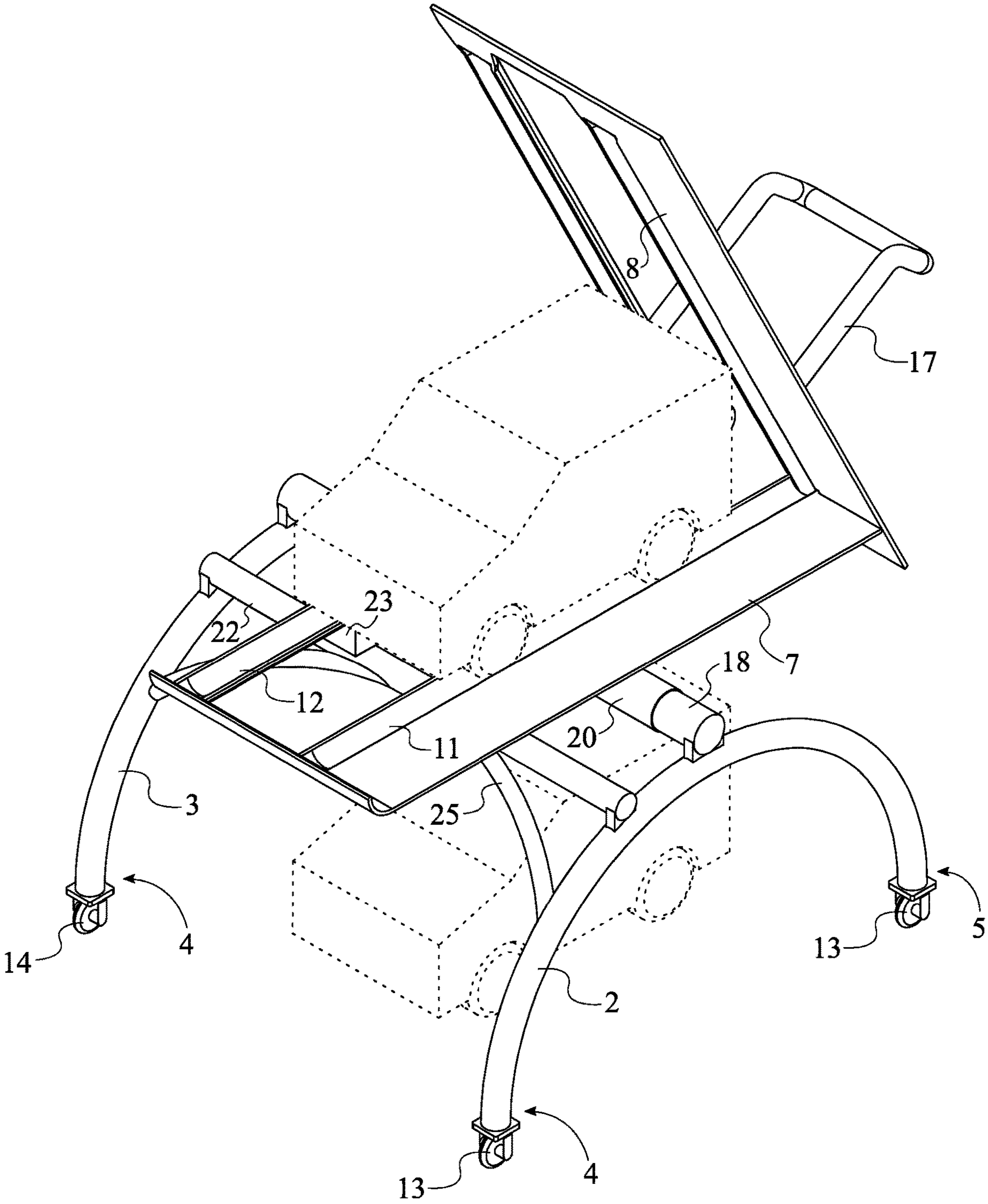
FIG. 7 is a front-top perspective view of the present invention with the parking platform in the parking configuration, an automobile parked on the parking platform, and another automobile parked beneath the support structure.

With reference to FIGS. 6 and 7, the parking platform 6 and the rotation stopping device 21 can be arranged into a parking configuration. FIG. 4 displays the parking platform 6 in an intermediate step when changing the configuration of the parking platform 6 from the loading configuration to the parking configuration. The parking configuration allows at least one automobile to be parked on the parking platform 6 and at least one other automobile to be parked beneath the support structure 1. In the parking configuration, the first section 7 and the second section 8 are oriented at an acute angle 24 to each other. This arrangement provides a passage for at least one other automobile to respectively drive into and park in the clearance area underneath the support structure 1. Further, the first brace 22 and the second brace 24 are pressed against each other to prevent the parking platform 6 from being over tilted, and thus preventing an automobile from rolling off the parking platform 6.

In another embodiment of the present invention, the present invention may further comprise a winch. The winch allows the present invention to be easily hauled for transport. The winch is mounted laterally onto the first support arch 2 and positioned offset between the first arch end 4 of the first support arch 2 and the second arch end 5 of the first support arch 2. This arrangement allows the winch to be easily accessed by a user. Thus, allowing said user to haul the present invention for transport.

The main purpose of the parking platform 6 is to allow at least one automobile to be parked. A secondary purpose of the parking platform 6 is to allow users of at least one automobile to walk down the parking platform 6 after parking his or her automobile. Therefore, the present invention may further comprise a walkway in another embodiment of the present invention. The walkway is a surface that allows a user to safely walk down and off the parking platform 6 after parking his or her automobile. The walkway is integrated into the parking platform 6 and positioned offset from the first wheel track 11.

In another embodiment of the present invention, the present invention may further comprise a pull string. The pull string allows a user to manually rotate the second section 8 about the first section 7 in order to orient the second section 8 into the loading configuration. The pull string is connected to the distal end of the second section 8. This arrangement allows a user to easily access the pull string.

In another embodiment of the present invention, the first rotation mechanism 19 and the second rotation mechanism 20 may be electronic rotation devices. This would allow a user to remotely rotate the second section 8 about the first section 7. Moreover, this allow a user to remotely tilt the first section 7 about the support structure 1.

In another embodiment of the present invention, the present invention may further comprise a net. The net is used to prevent users from accidentally falling off the parking platform 6 when walking down and off the parking platform 6 after parking his or her automobile. The net is mounted across the parking platform 6 and positioned adjacent to the walkway. This arrangement positions the net near the walkway of the parking platform 6 and thus prevents a user from accidentally falling off the parking platform 6.

In another embodiment of the present invention, the present invention may further comprise a first pair of brakes and a second pair of brakes. The first pair of brakes and the second pair of brakes are used to prevent the support structure 1 from accidentally traversing across a ground surface. The first pair of brakes are operatively coupled to the first pair of wheels 13, and the second pair of brakes are operatively coupled to the second pair of wheels 14.

Although the invention has been explained in relation to its preferred embodiment, it is to be understood that many other possible modifications and variations can be made without departing from the spirit and scope of the invention as hereinafter claimed.

What is claimed is:

1. A balance and lift parking apparatus comprises:
a support structure;
a parking platform;
a first wheel track;
a second wheel track;
the parking platform comprises a first section and a second section;
the first section being hingedly and terminally connected to the second section;
the first section being hingedly and laterally connected to the support structure;
the first wheel track and the second wheel track being integrated into the parking platform;
the first wheel track and the second wheel track being positioned parallel and opposite to each other across the parking platform;
a fulcrum;
the first section being hingedly connected to the support structure by the fulcrum;
the support structure comprises a first support arch, a second support arch, and a third support arch;

the first support arch and the second support arch being positioned offset from each other;
the third support arch being positioned between the first support arch and the second support arch.

2. The balance and lift parking apparatus as claimed in claim 1 comprises:
a first pair of wheels;
a second pair of wheels;
the first support arch and the second support arch each comprise a first arch end and a second arch end;
the first pair of wheels being mounted to the first arch end of the first support arch and the second arch end of the first support arch; and
the second pair of wheels being mounted to the first arch end of the second support arch and the second arch end and the second support arch.

3. The balance and lift parking apparatus as claimed in claim 1 comprises:
the first support arch and the second support arch each comprise a first arch end and a second arc end; and
the third support arch being positioned offset from the first arch end of the first support arch and the first arch end of the second support arch.

4. The balance and lift parking apparatus as claimed in claim 1 comprises:
an elongated wheel chock;
the first section and the second section each comprise a proximal end and distal end;
the proximal end of the first section being hingedly connected to the proximal end of the second section; and
the elongated wheel chock being integrated into the distal end of the first section.

5. The balance and lift parking apparatus as claimed in claim 1 comprises:
a weight-reducing cutout;
the weight-reducing cutout traversing through the parking platform; and
the weight-reducing cutout being positioned between the first wheel track and the second wheel track.

6. The balance and lift parking apparatus as claimed in claim 1 comprises:
a platform stand; and
the platform stand being mounted to the second section, opposite the first wheel track and the second wheel track.

7. The balance and lift parking apparatus as claimed in claim 1 comprises:
a first rotation mechanism; and
the first rotation mechanism being operatively coupled to the hinged connection between the first section and the second section, wherein the first rotation mechanism is used to fold in or unfold out the second section.

8. The balance and lift parking apparatus as claimed in claim 1 comprises:
a second rotation mechanism; and
the second rotation mechanism being operatively coupled to the hinged connection between the first section and the support structure, wherein the second rotation mechanism is used to tilt the first section about the support structure.

9. The balance and lift parking apparatus as claimed in claim 1 comprises:
a rotation stopping device;
the rotation stopping device comprises a first brace and a second brace;
the first brace being connected across the support structure;
the first brace being positioned offset from the parking platform;
the second brace being laterally connected to the first section; and
the second brace being positioned opposite to the first wheel track and the second wheel track.

10. The balance and lift parking apparatus as claimed in claim 9 comprises:
wherein the parking platform and the rotation stopping device are arranged into a loading configuration;
the first section and the second section being positioned coplanar to each other; and
the first brace and second brace being positioned offset from each other.

11. The balance and lift parking apparatus as claimed in claim 9 comprises:
wherein the parking platform and the rotation stopping device are arranged into a parking configuration;
the first section and the second section being oriented at an acute angle to each other; and
the first brace and second brace being pressed against each other.

* * * * *